United States Patent
Draznin et al.

(10) Patent No.: US 9,544,944 B2
(45) Date of Patent: Jan. 10, 2017

(54) ADAPTIVE, PERSONAL LOCALIZED CACHE CONTROL SERVER

(71) Applicants: Verizon Patent and Licensing Inc., Arlington, VA (US); Cellco Partnership, Arlington, VA (US)

(72) Inventors: Sagiv Draznin, Walnut Creek, CA (US); Patricia R. Chang, San Ramon, CA (US); Lalit R. Kotecha, San Ramon, CA (US); Steven R. Rados, Danville, CA (US); Donna L. Polehn, Kirkland, WA (US); Thomas W. Haynes, San Ramon, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 268 days.

(21) Appl. No.: 13/729,555

(22) Filed: Dec. 28, 2012

(65) Prior Publication Data
US 2014/0189034 A1 Jul. 3, 2014

(51) Int. Cl.
G06F 15/167 (2006.01)
H04W 92/18 (2009.01)
G06F 17/30 (2006.01)
H04W 76/02 (2009.01)

(52) U.S. Cl.
CPC ........ *H04W 92/18* (2013.01); *G06F 17/30902* (2013.01); *H04W 76/023* (2013.01)

(58) Field of Classification Search
CPC ........ H04L 67/104; H04L 63/04; H04L 67/06; G06F 15/167; G06F 17/30902
USPC ......................................................... 709/213
See application file for complete search history.

(56) References Cited

U.S. PATENT DOCUMENTS

| | | | |
|---|---|---|---|
| 2007/0005797 A1* | 1/2007 | Fontijn et al. | 709/238 |
| 2007/0174246 A1* | 7/2007 | Sigurdsson et al. | 707/3 |
| 2012/0089699 A1* | 4/2012 | Cholas | 709/217 |
| 2013/0117381 A1* | 5/2013 | Garcia et al. | 709/206 |
| 2014/0053078 A1* | 2/2014 | Kannan | 715/748 |
| 2014/0095601 A1* | 4/2014 | Abuelsaad et al. | 709/204 |

\* cited by examiner

*Primary Examiner* — Liangche A Wang
*Assistant Examiner* — Ayele Woldemariam

(57) ABSTRACT

A server may be configured to receive an indication that a first user device stores a particular content item; receive, from a second user device, a request for content; and determine that the requested content is available from the first user device. The determining may include determining that the particular content item stored by the first user device corresponds to the request for content, and determining that a local peer connection is available between the first user device and the second user device. The server may further output, to the first user device, an instruction to output the requested content to the second user device via the local peer connection, and/or the server may output, to the second user device, information which may allow the second user device to request the content from the first user device via a local peer connection.

18 Claims, 12 Drawing Sheets

ADAPTIVE, PERSONAL LOCALIZED CACHE CONTROL SERVER

BACKGROUND

Wireless telephones may be used for a variety of purposes. For example, wireless telephones may be used for Internet-based applications, such as browsing web sites that are available on the Internet. Wireless telephones may retain a cache of visited web sites, which may facilitate faster browsing when subsequently visiting web sites that have already been visited.

DETAILED DESCRIPTION OF PREFERRED EMBODIMENTS

The following detailed description refers to the accompanying drawings. The same reference numbers in different drawings may identify the same or similar elements.

Systems and methods described herein may allow user devices (e.g., wireless telephones) to act as ad-hoc content delivery devices for other user devices. For example, a user device may use a local peer connection in order to provide content to another user device. A "local peer" connection, as used herein, may refer to a connection in which a user device communicates directly with another user device (e.g., through respective wireless radios associated with the user devices, without communicating via another network device, such as a router, access point, base station, etc.). As described further below, a cache control server may assist in controlling content delivery between user devices.

Figure 1:
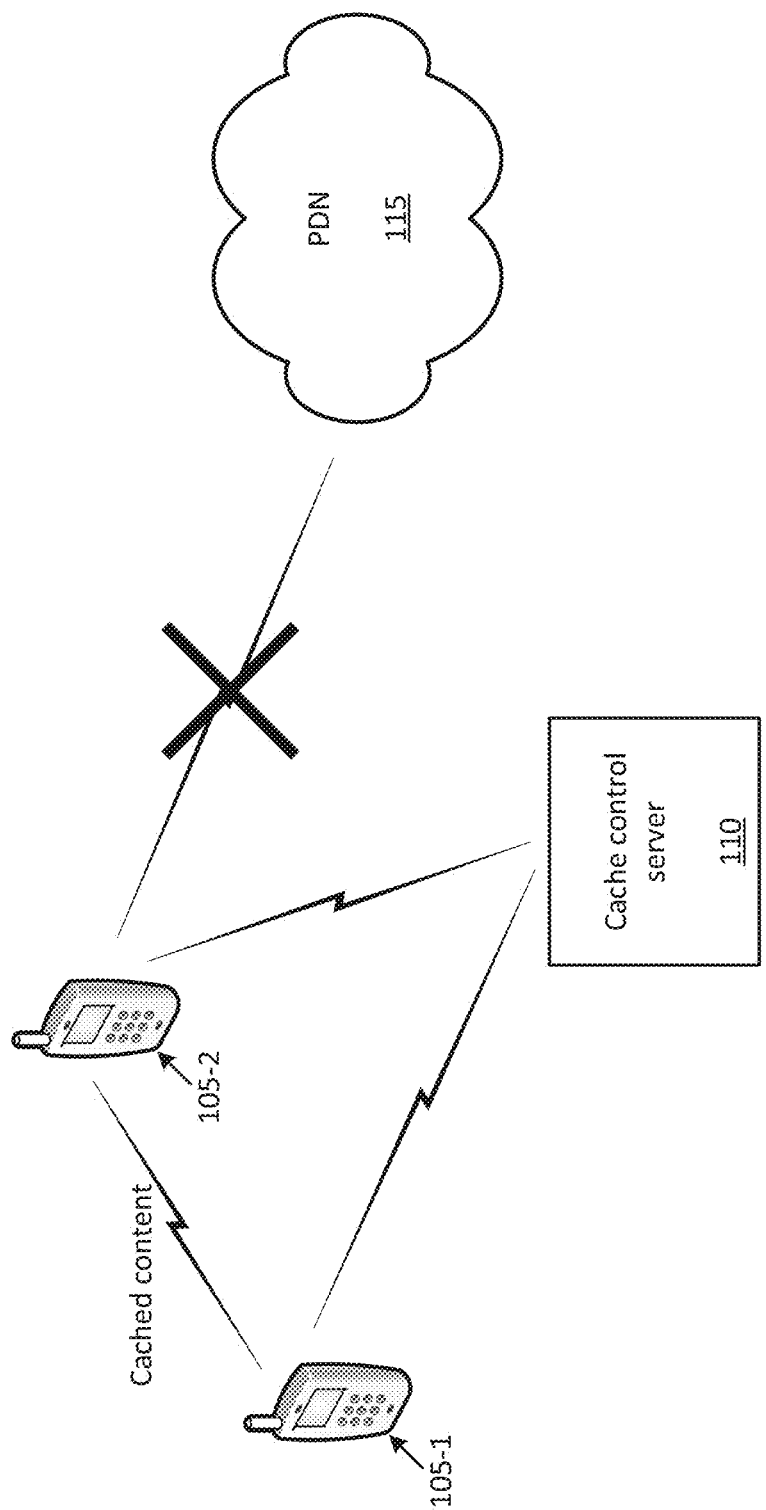
FIG. 1 illustrates an overview of one or more example implementations described herein.

FIG. 1 illustrates an example overview of one or more example implementations described herein. As shown in FIG. 1, user devices 105-1 and 105-2 (hereinafter referred to collectively as "user devices 105," or individually as "user device 105") may be communicatively coupled to each other via a local peer connection. User devices 105 may also be communicatively coupled to cache control server 110 via, for example, a radio access network ("RAN"), such as a RAN associated with a wireless telecommunication network. User device 105-2 may be communicatively coupled (e.g., via the RAN) to a packet data network ("PDN"), such as the Internet.

In the example shown in FIG. 1, assume that user device 105-1 stores content, such as a cached copy of a web page that is accessible via PDN 115. This cached copy may enable user device 105-1 to more quickly present the web page, for example when the web page is requested to be viewed by a user of user device 105-1. For instance, instead of requesting the web page from PDN 115, user device 105-1 may present the cached copy. User device 105-1 may provide an indication to cache control server 110 that user device 105-1 is storing the cached copy of the web page.

Further assume that user device 105-2 outputs a request to access the same web page (e.g., when a user of user device 105-2 desires to view the same web page). User device 105-2 may send a request to cache control server 110 for the web page. Cache control server 110 may determine that user device 105-1 stores a cached copy of the requested web page, and may provide an indication to user device 105-2 that user device 105-1 stores the cached copy of the web page. Based on receiving this indication, user device 105-2 may request, via a local peer connection, the cached copy of the web page from user device 105-1. User device 105-1 may provide the cached copy of the web page from user device 105-1.

As designated by the "X" between user device 105-2 and PDN 115 in FIG. 1, receiving a cached copy of the web page from user device 105-1 may eliminate that need for user device 105-2 to receive the web page from PDN 115. The removal of the need for such communication between user device 105-2 and PDN 115 may provide several advantages. For example, the local peer connection between user devices 105 may be faster than (e.g., may have a higher throughput and/or a lower latency time) a connection between user device 105-2 and PDN 115. Thus, the web page may be presented by user device 105-2 faster, thus yielding an improved user experience. Furthermore, by forgoing communications between user device 105-2 and PDN 115, the load on network devices (e.g., network devices associated with a RAN) may be reduced, thus saving network providers' costs and improving network performance for other tasks.

Additionally, according to some implementations, a particular user device 105 may publish stored content for sharing via a local peer connection. This may allow user device 105 to act as a content server, which may provide content via a local peer connection (thus providing similar benefits described above with regard to reducing load on network resources). Furthermore, allowing user device 105 to act as a content server may enhance the experience of a user associated with user device 105, as well as the experiences of other users that access the content shared by user device 105.

Figure 2:
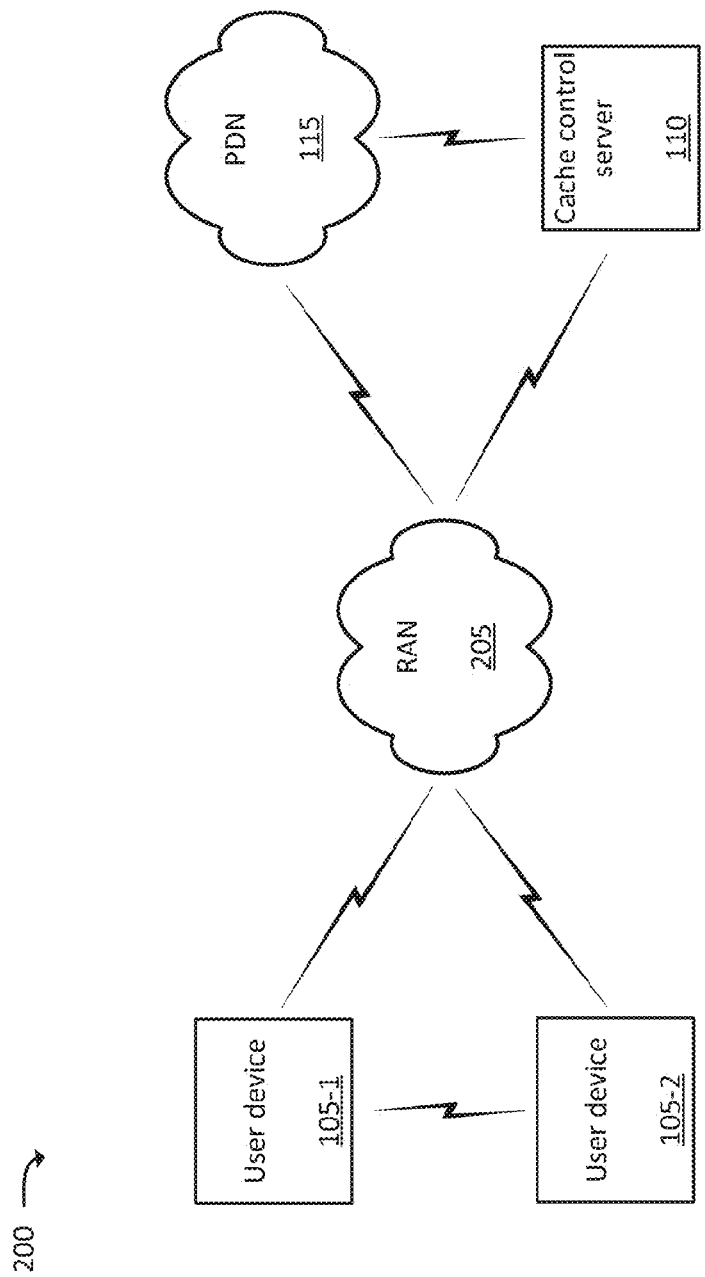
FIG. 2 illustrates an example environment in which systems and/or methods, described herein, may be implemented.

FIG. 2 illustrates an example environment 200, in which systems and/or methods described herein may be implemented. As shown in FIG. 2, environment 200 may include user devices 105, RAN 205, PDN 115, and cache control server 110. In practice, environment 200 may include additional, fewer, different, or differently arranged user devices and/or servers. Also, in some instances, a user device may perform a function of a server, or a server may perform a function of a user device.

User device 105 may include any computation and communication device, such as a wireless mobile communication device that is capable of communicating with one or more other devices and/or networks shown in FIG. 2. For example, user device 105 may include a radiotelephone; a personal communications system ("PCS") terminal (e.g., a device that combines a cellular radiotelephone with data processing and data communications capabilities); a personal digital assistant ("PDA") (e.g., that can include a radiotelephone, a pager, Internet/intranet access, etc.); a smart phone; a laptop computer; a tablet computer; a camera; a personal gaming system, or another type of mobile computation and communication device. User device 105 may send traffic to and/or receive traffic from PDN 115 via RAN 205.

RAN 205 may include one or more devices that act as signal bearers, such as a base station, a serving gateway ("SGW"), a packet data network gateway ("PGW"), and/or another device. In some implementations, RAN 205 may include a long term evolution ("LTE") network, in which base stations may take the form of evolved node-Bs ("eNBs"). In some implementations, RAN 205 may include, or may be in communication with, a wireless local area network ("WLAN") network. A WLAN network may include a set of wireless access points, which may correspond to, for example, a IEEE 802.11x standard for wireless communications.

As also mentioned above, user devices 105 may communicate with each other over one or more local peer connections. For example, user devices 105 may each include a set of radio transceivers, via which user devices 105 may communicate (e.g., may communicate directly, without communicating via RAN 205 or another network). The radio transceivers may include, for instance, a Bluetooth radio transceiver, a WLAN radio transceiver (e.g., a transceiver that corresponds to a IEEE 802.11x standard), a cellular radio transceiver (e.g., a transceiver that corresponds to LTE communications), a near field communication ("NFC") protocol radio transceiver, or another radio transceiver.

Cache control server 110 may include one or more server devices that facilitate the sharing of content stored by one user device 105 to another user device 105. As described in further detail below, cache control server 110 may receive and/or store information regarding locations of user devices 105, content stored by user devices 105, and/or other factors that may influence the ability of user devices 105 to share content.

PDN 115 may include any type of network, such as a local area network ("LAN"), a wide area network ("WAN"), a telephone network—e.g., the Public Switched Telephone Network ("PSTN")—an intranet, the Internet, or a combination of networks. User device 105 and/or cache control server 110 may connect to PDN 115 via wired and/or wireless connections. In other words, user device 105 and/or cache control server 110 may connect to PDN 115 via a wired connection, a wireless connection, or a combination of a wired connection and a wireless connection.

Figure 3:
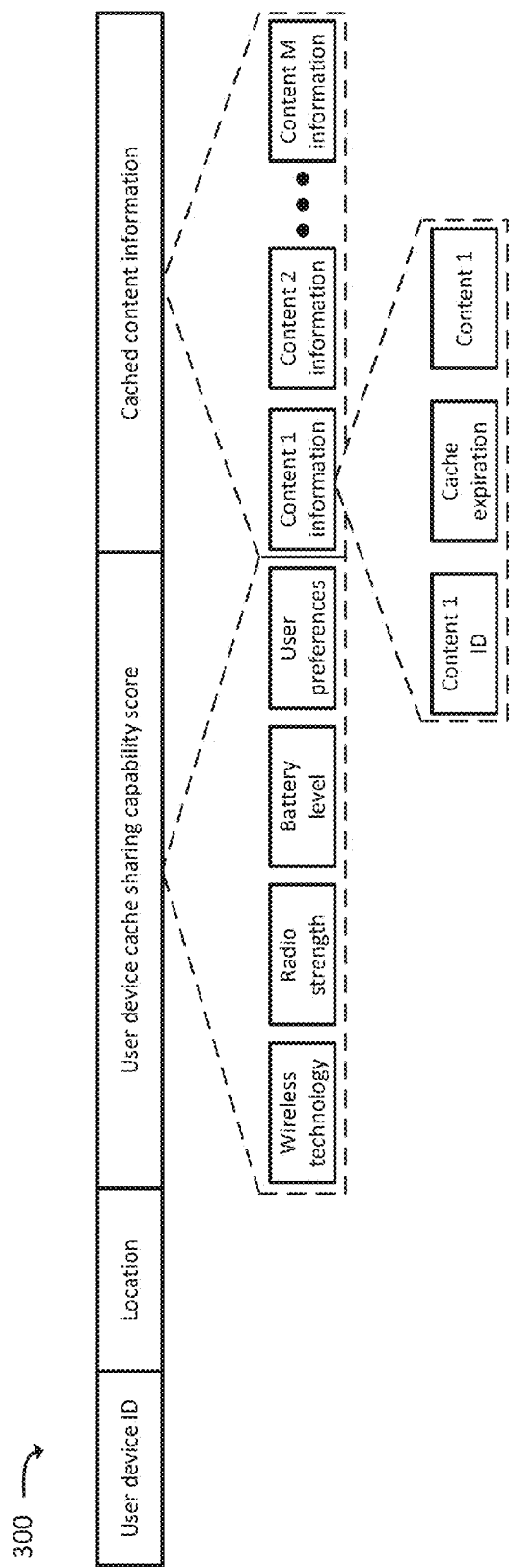
FIG. 3 illustrates an example data structure which may be stored by a cache control server.

FIG. 3 illustrates an example data structure 300 which may be stored by a cache control server, such as cache control server 110. Cache control server 110 may use data structure 300 to facilitate the sharing of content from one user device 105 to another user device 105 via a local peer connection. Data structure 300 may correspond to information corresponding to a particular user device 105. Thus, cache control server 110 may, in some implementations, store multiple instances of data structure 300, each instance corresponding to a particular user device 105.

As shown in FIG. 3, data structure 300, corresponding to a particular user device 105, may include information regarding an identifier of user device 105, information regarding a location of user device 105, information regarding a cache sharing capability score associated with user device 105, and information regarding cached content associated with user device 105. The information regarding the identifier of user device 105 (represented in FIG. 3 as "User device ID") may include identification information, such as an international mobile subscriber identity ("IMSI") number, an international mobile station equipment identity ("IMEI") number, a mobile directory number ("MDN"), an Internet Protocol ("IP") address, a media access control ("MAC") address, a logical name, a Bluetooth identification number, and/or another identifier.

Cache control server 110 may receive the information regarding the identifier of user device 105 from user device 105, and/or from one other devices. For instance, cache control server 110 may receive information regarding the identifier of user device 105 from one or more networks associated with user device 105, such as a mobile management entity ("MME"), a home subscriber server ("HSS"), an authentication, authorization, and accounting ("AAA") server, a policy charging and rules function ("PCRF") server, and/or another device.

The information regarding the location of user device 105 may include information regarding a geographical location of user device 105, such as a set of latitude and longitude coordinates. Additionally, or alternatively, the information regarding the location of user device 105 may indicate one or more base stations and/or access points, via which user device 105 communicates with cache control server 110, RAN 205, and/or PDN 115.

Cache control server 110 may receive the information regarding the location of user device 105 from user device 105. For example, user device 105 may periodically collect geographical information using, for example, a global positioning system ("GPS") technique, and may output the collected location information to cache control server 110. Additionally, or alternatively, user device 105 may receive geographical location information from a cellular network associated with user device 105, and may output the received location information to cache control server 110. In some implementations, cache control server 110 may receive the location information from one or more other devices, such as one or more devices associated with a cellular network associated with user device 105.

In some implementations, cache control server 110 may rank user devices 105 based on cache sharing capability scores associated with user devices 105. Cache control server 110 may use this ranking when determining whether cached content is available at one or more user devices 105, and/if so, from which user device 105 cached content should be shared.

The cache sharing capability score associated with user device 105 may be based on one or more factors. Cache control server 110 may receive the information regarding the cache sharing capability score (and/or the information regarding the various factors) from user device 105 and/or another device, such as a MME, a HSS, a AAA server, a PCRF server, and/or another device. In some implementations, cache control server 110 may generate the cache sharing capability score based on these factors, while in some implementations, cache control server 110 may receive the cache sharing capability score from user device 105 and/or one or more other devices. As shown in FIG. 3, some example factors, upon which a cache sharing capability score may be based, may include wireless technology, radio strength, battery level, and user preferences.

In some implementations, cache control server 110 may score multiple cache sharing capability scores for a particular user device 105, each cache sharing capability score being associated with a different wireless technology. For example, one cache sharing capability score for user device 105 may be associated with a WLAN technology (e.g., a score that indicates a capability of user device 105 to share content via a WLAN local peer connection), while another cache sharing capability score for user device 105 may be associated with a Bluetooth technology (e.g., a score that indicates a capability of user device 105 to share content via a Bluetooth local peer connection).

The information regarding the radio strength may indicate a measure of how capable a radio transceiver, associated with a particular wireless technology, is of transmitting data to another radio transceiver. The information regarding the radio strength may be, for example, based on an amount of power supplied to the radio transceiver (e.g., a voltage). The information regarding the battery level may be based on amount of remaining battery power of a power source associated with user device 105.

The information regarding the user preferences may indicate, for example, whether a user of user device 105 wishes to share content via local peer connections. In some implementations, the user preferences may indicate specific resources of user device 105, and/or specific content stored by user device 105, that the user wishes to make available for sharing.

As also shown in FIG. 3, cached content information may include content regarding multiple items of content, stored by a particular user device 105. One particular content item may include a set of data that corresponds to, for example, a cached copy of a web page, a video content item, an audio content item, and/or another content item. The information regarding a particular content item may include several pieces of information regarding the particular content item, such as, for example, an identifier of the content, and information indicating a time of expiration of the content. In some implementations, data structure 300 may include the content itself (e.g., cache control server 110 may store a copy of the content item).

The content identifier (represented in FIG. 3 as, for example, "content 1 ID"), may indicate identifying information for a particular content item. The content identifier may include, for example, a link to the content item (e.g., a uniform resource locator ("URL"), a uniform resource identifier ("URI"), an IP address, and/or another indication of a logical location of the content item).

The information indicating a time of expiration of the content (represented in FIG. 3 as "cache expiration") may include, for example, a cache expiration date, a time stamp indicating a time that the content was accessed and/or stored, information identifying a duration for which the cached content is valid, etc. As described below, cache control server 110 may use this information when determining whether cached content is valid and available.

The "content" field may, in some implementations, include some or all of the content itself. This field may include, for example, a file, a set of files, a directory, and/or a set of directories that correspond to the content.

While an example data structure is described with respect to FIG. 3, in practice, data structure 300 may include one or more of any type of data structure, such as a table, an array, a linked list, a hash table, a tree, etc. Further, while example information, which may be stored by data structure 300, is shown in FIG. 3, in practice, data structure 300 may include additional, different, differently arranged, or less information.

Figure 4A:
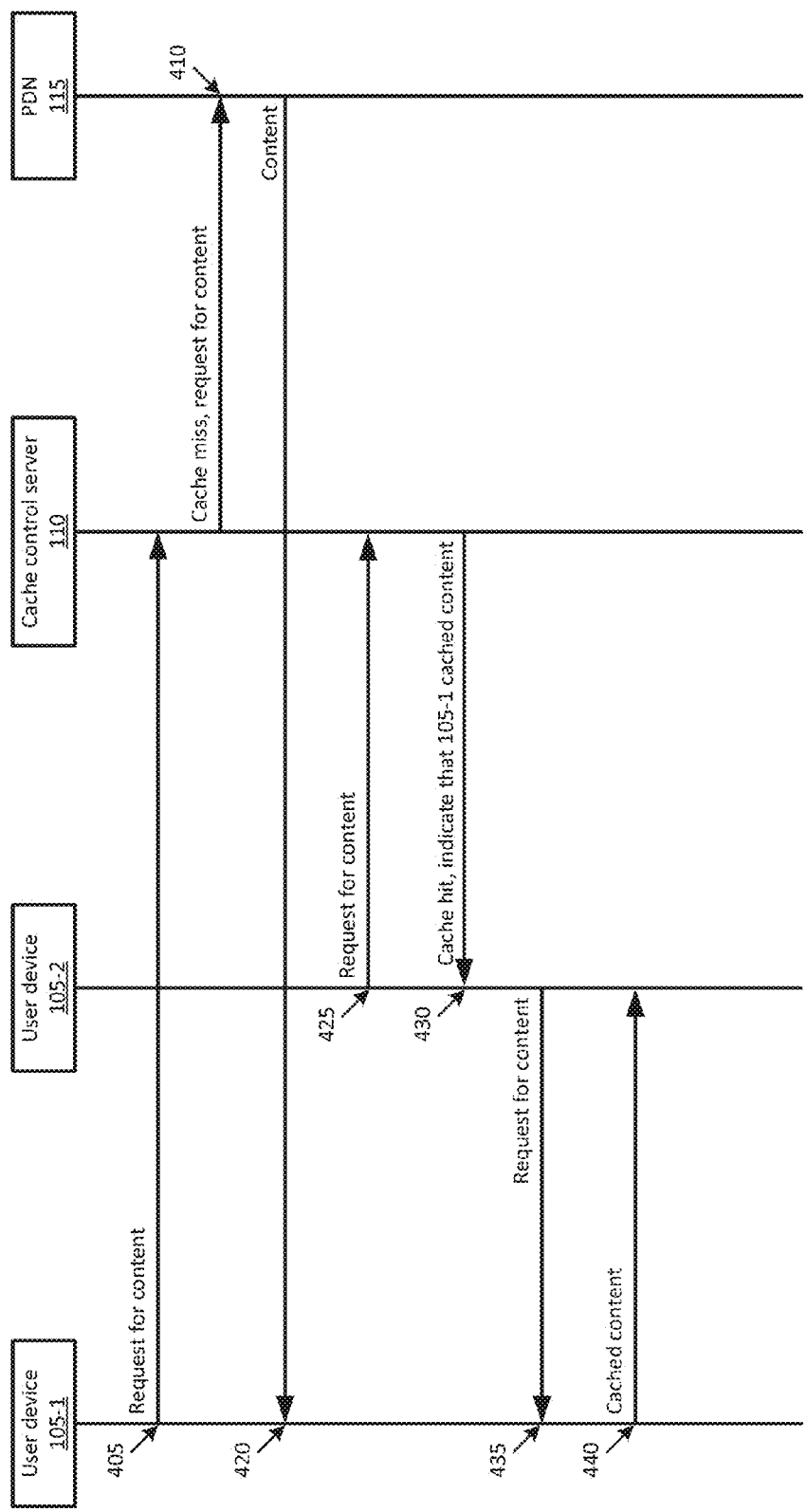
FIGS. 4A and 4B illustrate example signal flows, according to one or more implementations in which a user device provides cached content to another user device.
Figure 4B:
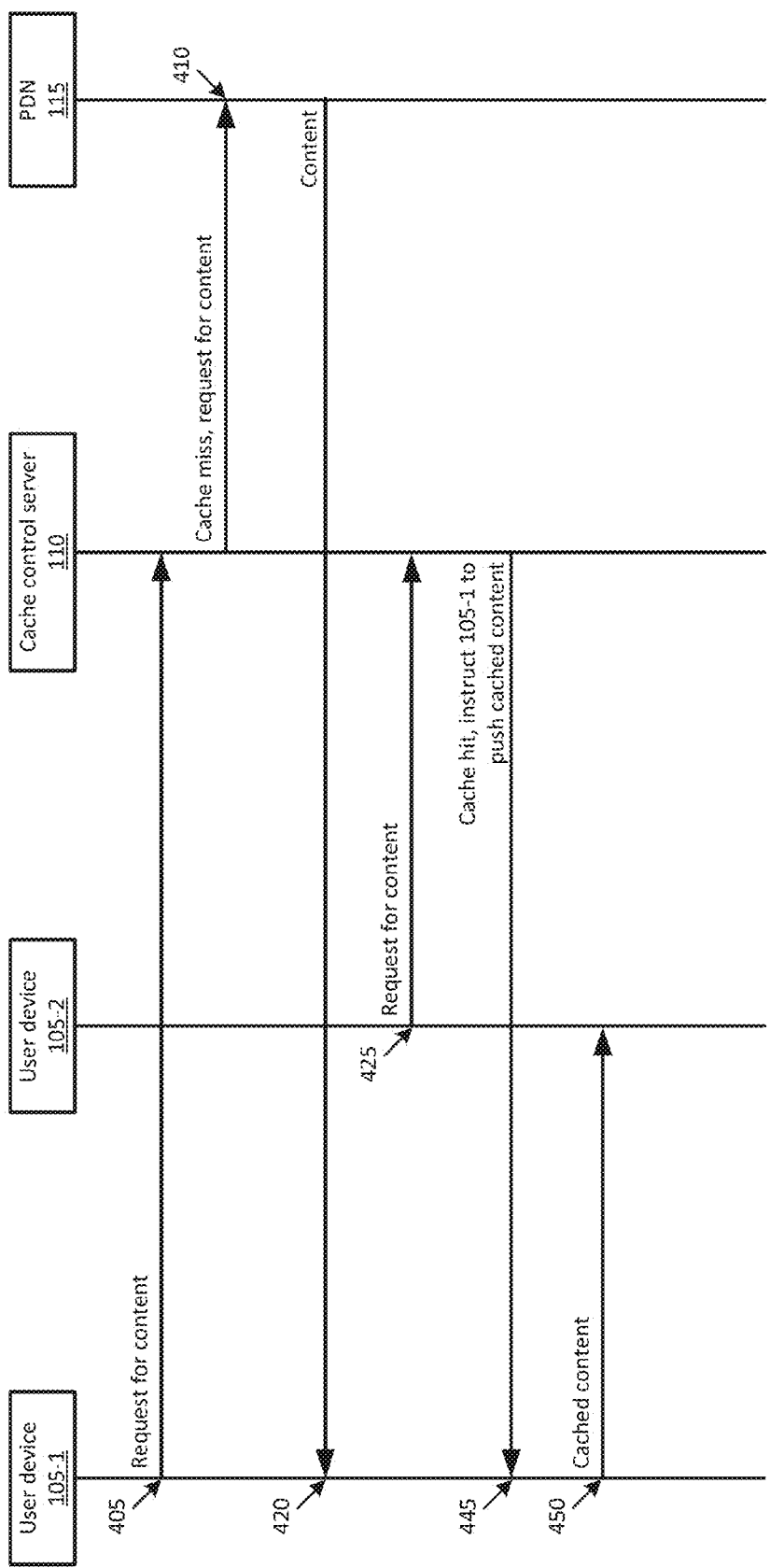

FIGS. 4A and 4B illustrate example signal flows, according to one or more implementations in which a user device (e.g., user device 105-1) may provide cached content to another user device (e.g., user device 105-2). As shown in FIG. 4A, user device 105-1 may send (at 405) a request for content to cache control server 110. The request for content may correspond to, for example, a request for content that is accessible via PDN 115. For example, the request for content may include a URL, a URI, an IP address, and/or another identifier of the content. The request for content may be made by user device 105-1 based on, for example, a web browser program of user device 105-1 receiving input from a user indicating that the user wishes to access the content. In some implementations, requests for content, from user devices 105, may be addressed to servers in PDN 115, and cache control server 100 may receive (e.g., intercept) these requests for content.

Cache control server 110 may receive the request (outputted at 405), and may determine whether cached content is available, that corresponds to the requested content. For example, cache control server 110 may determine whether one or more user devices 105, which are located near user device 105-1, store a cached copy of the requested content.

Cache control server 110 may, for example, determine a location of user device 105-1. In some implementations, the request (outputted at 405) may include information, based on which cache control server 110 may determine the location of user device 105-1. In some implementations, cache control server 110 may determine the location of user device 105-1 based on a location of one or more network devices, via which cache control server 110 receives the request. For example, cache control server 110 may determine the location of user device 105-1 based on a location of a base station via which cache control server 110 receives the request. In some such implementations, cache control server 110 may receive and/or store information indicating locations of such network devices. In some implementations, cache control server 110 may determine the location of user device 105-1 based on information previously received and/or stored by cache control server 110 (e.g., based on the location information stored by data structure 300, as shown in FIG. 3). In some implementations, user device 105-1 may determine whether one or more other user devices 105 are within range of user device 105-1, and may provide information regarding any such devices to cache control server 110.

Cache control server 110 may determine, based on the location of user device 105-1, whether one or more other user devices 105 are in the vicinity of (e.g., within a particular distance of) user device 105-1. For example, cache control server 110 may compare the determined location of user device 105-1 to locations of other user devices 105 (e.g., based on location information stored by data structure 300). In some implementations, the determination of whether one or more other user devices 105 are in the vicinity of user device 105-1 may be based on a wireless technology associated with user device 105-1. For example, assume that user device 105-1 includes a Bluetooth radio transceiver and a WLAN radio transceiver, both of which may be capable of being used for local peer connections. When determining whether one or more other user devices 105 are in the vicinity of user device 105-1, cache control server 110 may determine whether user devices 105, which are associated with a WLAN wireless technology, are within 25 meters of user device 105-1, and may determine whether user devices 105, which are associated with a Bluetooth wireless technology, are within 10 meters of user device 105-1.

If one or more user devices 105 are located within the vicinity of user device 105-1, cache control server 110 may determine whether the one or more user devices 105 store a copy of the requested content. For example, cache control server 110 may compare information identifying the content, in the request, to information identifying content stored by the one or more user devices 105 (e.g., the "content ID" information stored by data structure 300). For instance, assume that the requested content is a web page located at the URL "www.foo.com." Cache control server 110 may determine whether any of the one or more user devices 105 store a cached copy of the web page located at "www.foo.com." Assume that a particular user device 105 stores a cached copy of the web page located at "www.foo.com." In some implementations, cache control server 110 may determine whether the cached copy is expired (e.g., based on the "cache expiration" information stored by data structure 300).

As shown in FIG. 4A, assume that cache control server 110 determines that there is a "cache miss." That is, FIG. 4A may determine that no user devices 105 in the vicinity of user device 105-1 store the requested content. Such a situation may occur when no user devices 105 are in the vicinity of user device 105-1, when no user devices 105 in the vicinity of user device 105-1 store content that matches the requested content, and/or when no user devices 105 in the vicinity of user device 105-1 store non-expired content that matches the requested content.

As further shown in FIG. 4A, cache control server 110 may request (at 410) the content requested by user device 105-1 from PDN 115. Continuing with the above example, cache control server 110 may request the web page located at "www.foo.com" by making, for example, a hypertext transfer protocol ("HTTP") request. PDN 115 may provide (at 420) the requested content to user device 105-1 (e.g., via one or more other network devices and/or, in some implementations, via cache control server 110).

In some implementations, cache control server 110 may store information indicating that the content was sent to user device 105-1 (and, thus, is stored by user device 105-1). Additionally, or alternatively, user device 105-1 may provide an indication to cache control server 110, indicating that user device 105-1 is storing a cached copy of the content.

As also shown in FIG. 4A, user device 105-2 may output (at 425) a request, for the same content (requested at 405), to cache control server 110. Cache control server 110 may determine that there is a "cache hit." That is, that user device 105-1 is within a particular distance of user device 105-2, and that user device 105-1 stores a non-expired cached copy of the requested content. In some implementations, in order to determine that there is a "cache hit," cache control server 110 may also determine that user device 105-1 is capable of outputting the cached content to user device 105-2. For example, cache control server 110 may determine whether a cache sharing capability score (e.g., as stored by data structure 300) is at least a particular threshold score. As mentioned above, the cache sharing capability score may be based on, for instance, radio strength, battery level, and/or user preferences associated with user device 105-1.

Based on determining that there has been a "cache hit," cache control server 110 may output (at 430) an indication to user device 105-2 that user device 105-1 is storing a cached copy of the requested content. Based on receiving the indication that user device 105-1 stores a cached copy of the requested content, user device 105-2 may output (at 435) a request for the content to user device 105-1. In some implementations, user device 105-2 may output (at 435) the request to user device 105-1 via a local peer connection. Based on receiving the request, user device 105-1 may output (at 440) the cached copy of the content to user device 105-2 via, for example, a local peer connection.

In some situations, a false "cache hit" may occur when cache control server 110 incorrectly informs (at 430) user device 105-2 that user device 105-1 stores the content. Such a situation may occur when, for example, user device 105-1 did not actually cache the content, or when the cached content was erased at user device 105-1. In this situation, user device 105-1 may provide a notification to user device 105-2, indicating that user device 105-1 does not store a copy of the content. User device 105-2 may subsequently send another request for the content to cache control server 110 (e.g., with an indication that cached content is not available), based on which cache control server 110 may obtain the content from PDN 115, and provide the content to cache control server 110.

FIG. 4B shows a similar signal flow to the one shown in FIG. 4A, except that signals 430-440, shown in FIG. 4A, may be replaced with signals 445 and 450. In FIG. 4A, when a "cache hit" occurs, cache control server 110 may inform user device 105-2 that user device 105-1 stores the requested content, and user device 105-2 may request the content from user device 105-1. In FIG. 4B, when a "cache hit" occurs, cache control server 110 may instruct user device 105-1 to push the stored content user device 105-2 when user device 105-2 requests the content.

As shown in FIG. 4B, user device 105-2 may request (at 425) content from cache control server 110. Cache control server 110 may determine a "cache hit." Based on determining that a "cache hit" has occurred, cache control server 110 may output (at 445) an instruction to user device 105-1, instructing user device 105-1 to provide the stored content to user device 105-2. Based on the instruction, user device 105-1 may output (at 450) the stored content to user device 105-2.

Figure 5:
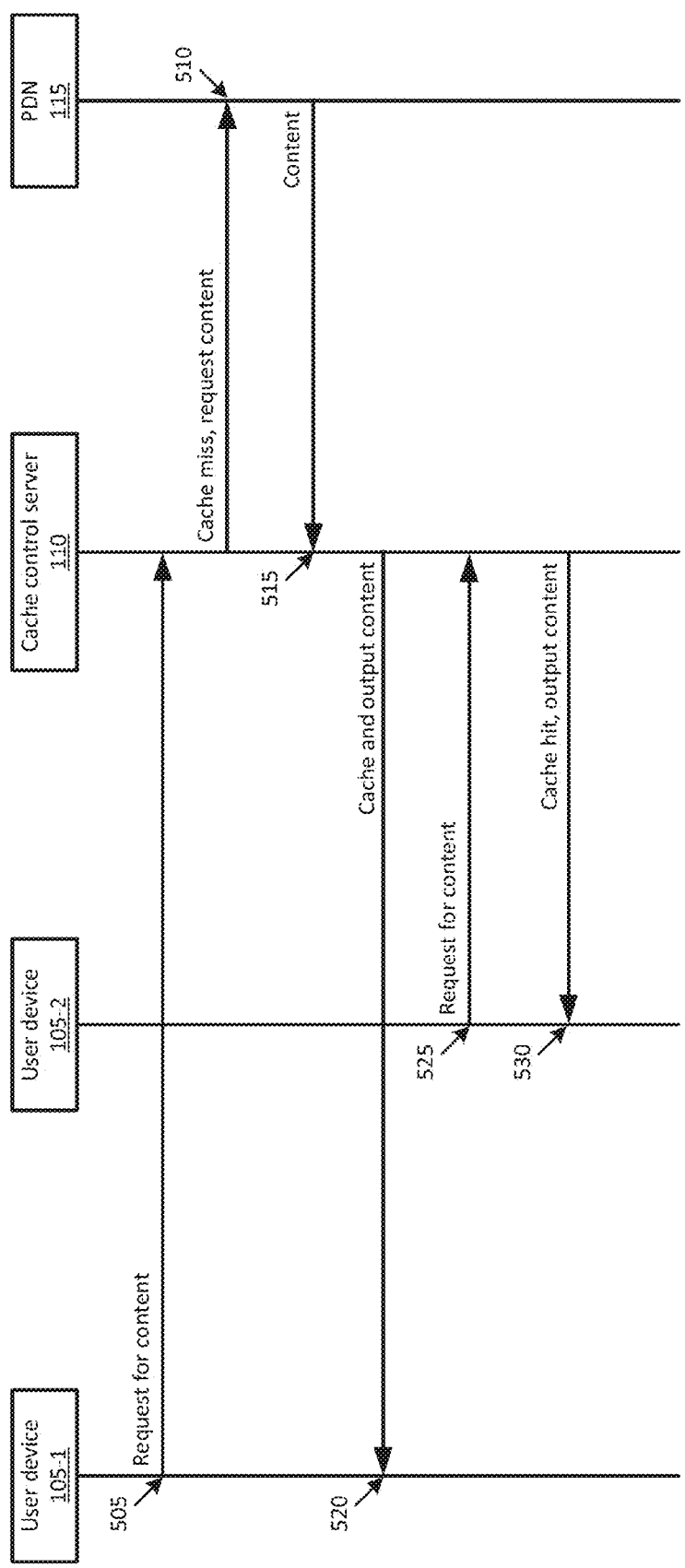
FIG. 5 illustrates an example flow, according to one or more implementations in which a cache control server may provide cached content to a user device.

FIG. 5 illustrates an example flow, according to one or more implementations in which a cache control server may provide cached content to a user device. Signals 505 and 510, shown in FIG. 5, may be similar to signals 405 and 410, shown in FIGS. 4A and 4B. For example, cache control server 110 may receive (at 505) a request for content from user device 105-1, and may determine that a "cache miss" has occurred, request (at 510) the content from PDN 115. Cache control server 110 may receive (at 515) the content from PDN 115.

As further shown in FIG. 5, cache control server 110 may store the received content, and may output (at 520) the content to user device 105-1. User device 105-2 may output (at 525) a request for the same content to cache control server 110. Cache control server 110 may determine the occurrence of a "cache" hit (i.e., that cache control server 110 stores a cached copy of the requested content). Cache control server 110 may output (at 530) the requested content to user device 105-2.

Figure 6:
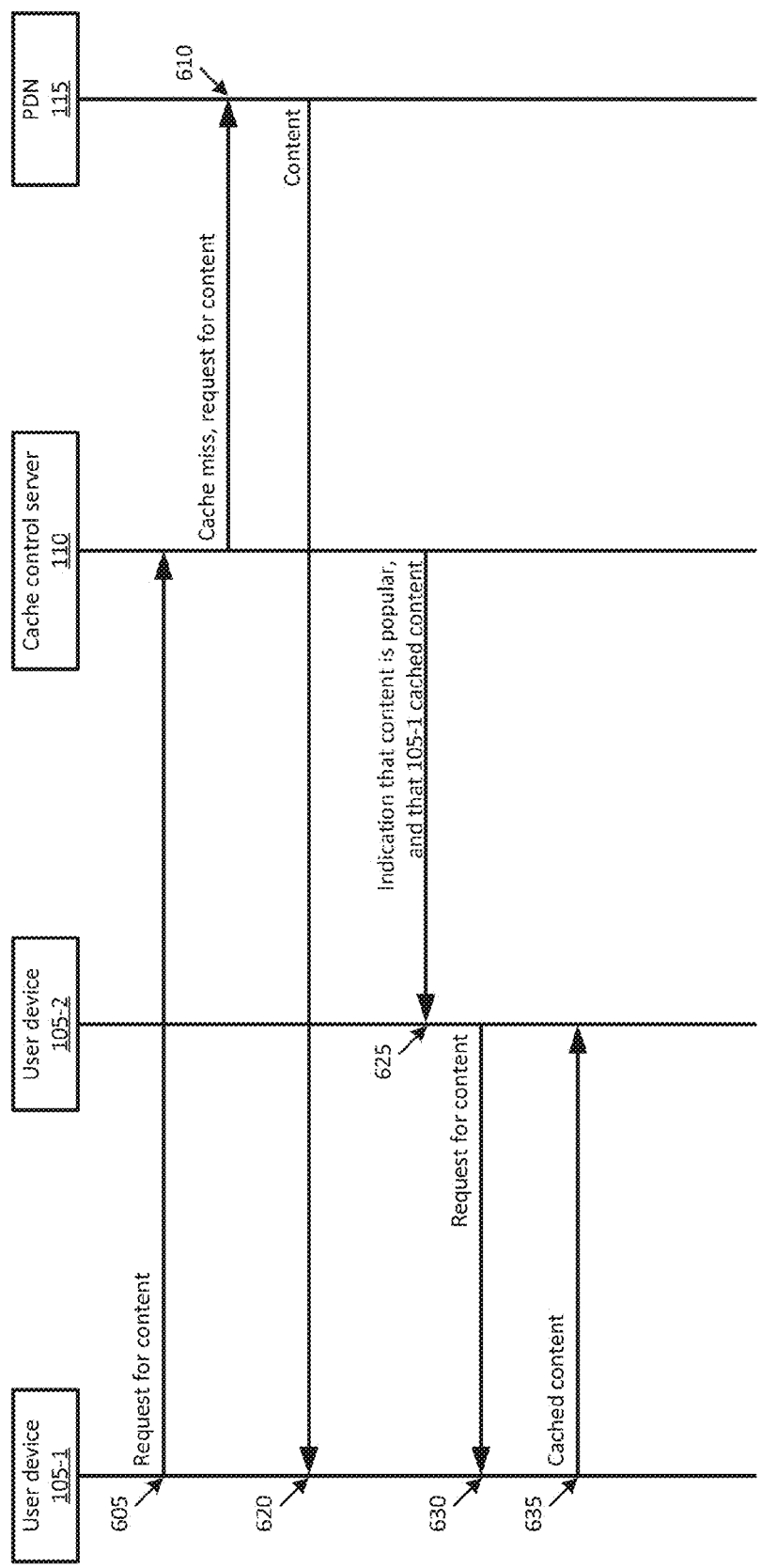
FIG. 6 illustrates an example signal flow, according to one or more implementations in which a user device may push popular content to another user device.

FIG. 6 illustrates an example signal flow, according to one or more implementations in which a user device may push popular content to another user device. Signals 605-620, shown in FIG. 6, may be similar to signals 405-420, shown in FIGS. 4A and 4B. For example, cache control server 110 may receive (at 605) a request for content from user device 105-1, determine that a "cache miss" has occurred, and request (at 610) the content from PDN 115. PDN 115 may output (at 620) the content to user device 105-1 (e.g., via one or more other network devices and/or, in some implementations, via cache control server 110).

In this situation, cache control server 110 may determine that the content is popular content. For example, cache control server 110 may determine that the content is popular based on having received many (e.g., at least a threshold quantity of requests over a particular period of time, requests for the content from at least a threshold quantity of user devices, and/or based on one or more other popularity factors) requests for the same content.

Based on determining that the content is popular content, cache control server 110 may provide (at 625) an indication to user device 105-2 that the content is popular, and that user device 105-1 is storing the content. In some implementations, this indication may be provided (at 625) without a request from user device 105-2 (e.g., this indication may be "pushed" to user device 105-2). Based on receiving this indication, user device 105-2 may request (at 630) the content from user device 105-1, and user device 105-1 may provide (at 635) the content to user device 105-2. Since the content is popular content, there may be a high likelihood that user device 105-2 will, at some point, attempt to access the content. By pushing the popular content to user device 105-2 without waiting for a request for the content, the content may be accessed by user device 105-2 faster than if the content had to be retrieved from elsewhere, thus enhancing the experience of a user of user device 105-2.

Figure 7:
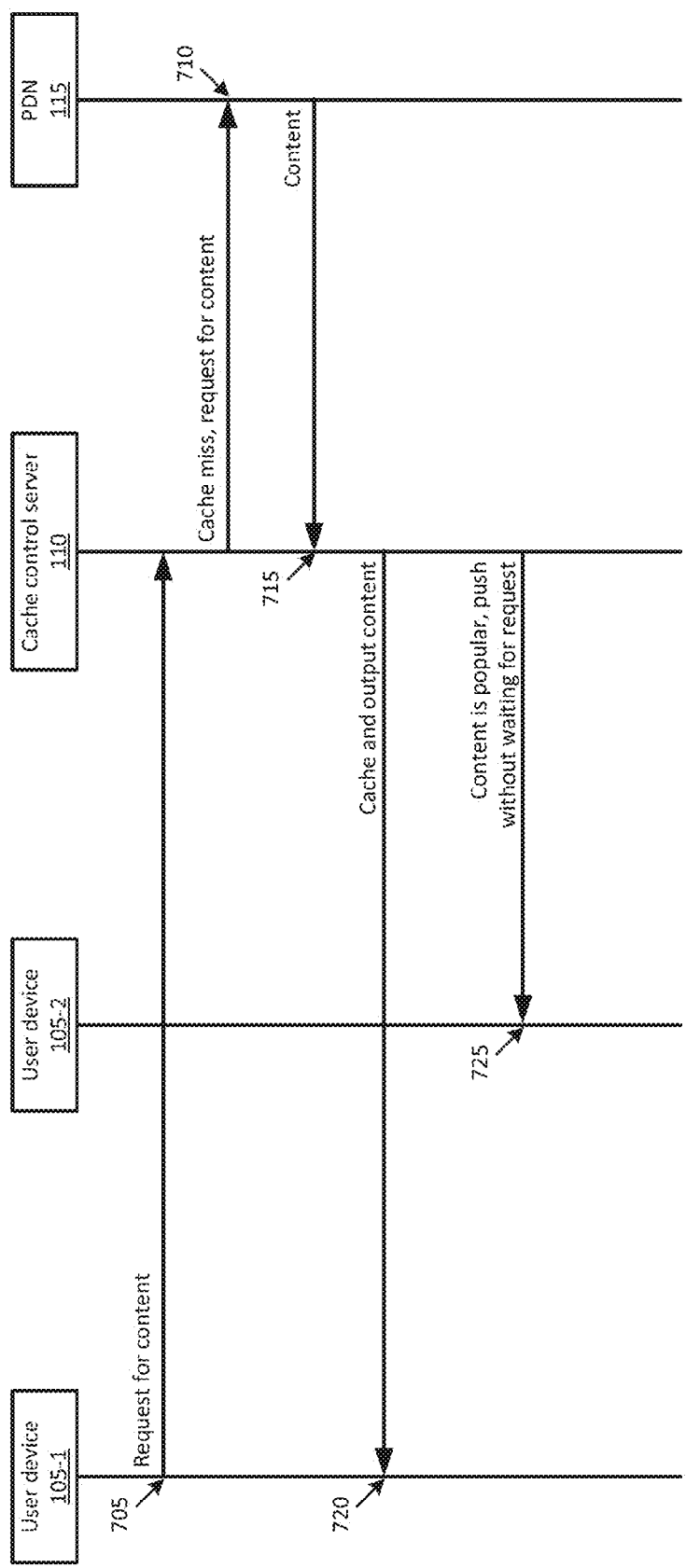
FIG. 7 illustrates an example signal flow, according to one or more implementations in which a cache control server may push popular content to a user device.

FIG. 7 illustrates an example signal flow, according to one or more implementations in which a cache control server may push popular content to a user device. Signals 705-720, shown in FIG. 7, may be similar to signals 505-520, shown in FIG. 5. For example, cache control server 110 may receive (at 705) a request for content from user device 105-1, determine that a "cache miss" has occurred, request (at 710) the content from PDN 115, receive (at 715) the content from PDN 115, and output (at 720) the content to user device 105-1.

As further shown in FIG. 7, cache control server 110 may determine that the content is popular content. Cache control server 110 may output (at 725) the content to user device 105-2, without a request for the content from user device 105-2. In this sense, cache control server 110 may "push" the content to user device 105-2.

Figure 8:
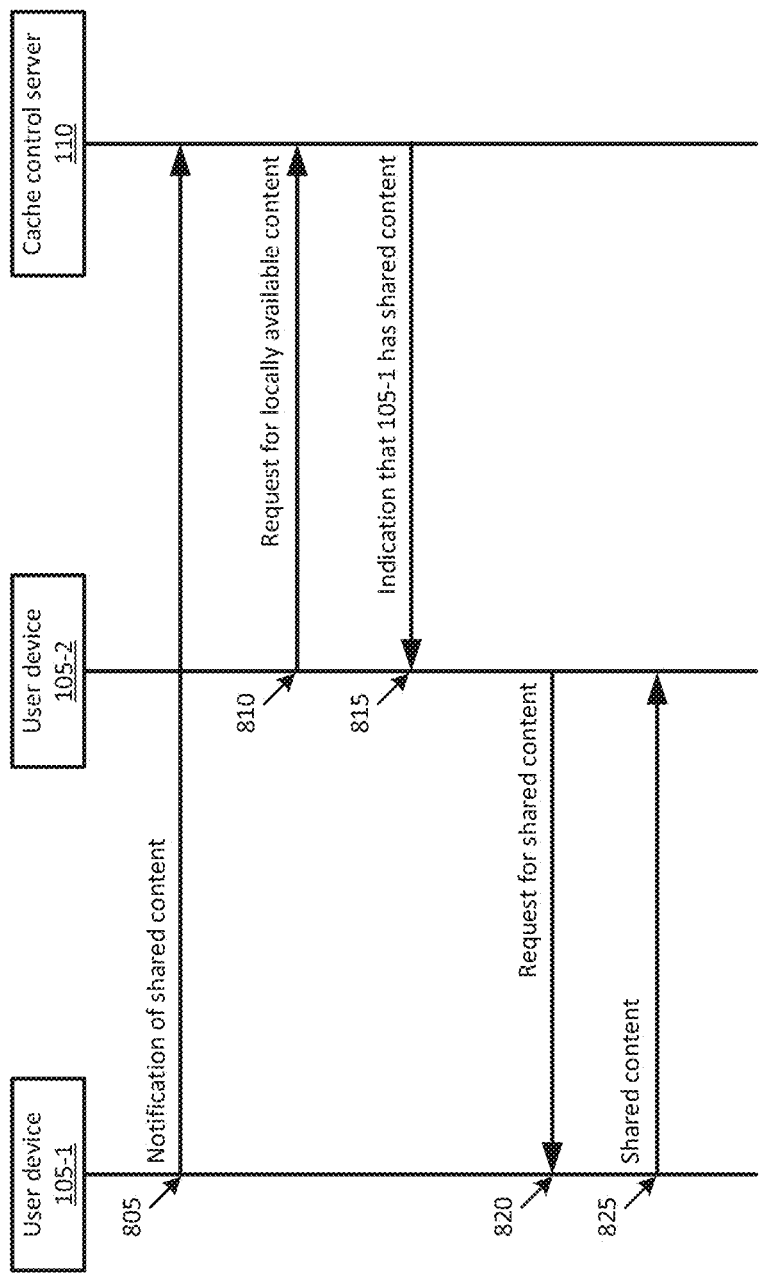
FIG. 8 illustrates an example signal flow, according to one or more implementations in which a user device may serve local content to another user device.

FIG. 8 illustrates an example signal flow, according to one or more implementations in which a user device may serve local content to another user device. As shown, user device 105-1 may output (at 805), to cache control server 110, a notification that user device 105-1 is sharing content. The content may be, for example, a web page, image content, video content, audio content, and/or another type of content. In some implementations, user device 105-1 may share access to one or more resources of user device 105-1, such as a camera or a microphone. That is, in some such implementations, user device 105-1 may allow other devices to access video captured by the camera and/or audio captured by the microphone. Cache control server 110 may store information regarding the content and/or resources shared by user device 105-1.

As further shown in FIG. 8, user device 105-2 may output (at 810) a request for available content to cache control server 110. For example, user device 105-2 may present an interface, via which a user may select an option to browse locally available shared content and/or resources (e.g., content that is shared by user devices 105 that are in the vicinity of user device 105-2).

Cache control server 110 may, in some implementations, determine that user device 105-1 is in the vicinity of user device 105-2. Based on the request, and based on determining that user device 105-1 and 105-2 are near each other, cache control server 110 may output (at 815) information to user device 105-2, indicating that user device 105-1 is sharing content. This information may include, for example, an identification of the content and/or resources. For example, assume that user device 105-1 is sharing an audio file and a web page. The information (sent at 815) may include, for example, a name of the audio file, a title of the web page, a thumbnail of the web page, a sound clip of the audio file, and/or other information. User device 105-2 may present, via an interface, some or all of the information (received at 815). The user may use this interface to browse the shared content, and may, for example, select one or more content items that the user wishes to access.

User device 105-2 may output (at 820) a request for particular shared content (e.g., content selected by a user via the above-mentioned interface) to user device 105-1. In some implementations, this request may be outputted via a local peer connection. Based on this request, user device 105-1 may output (at 825) the requested shared content to user device 105-2.

Figure 9:
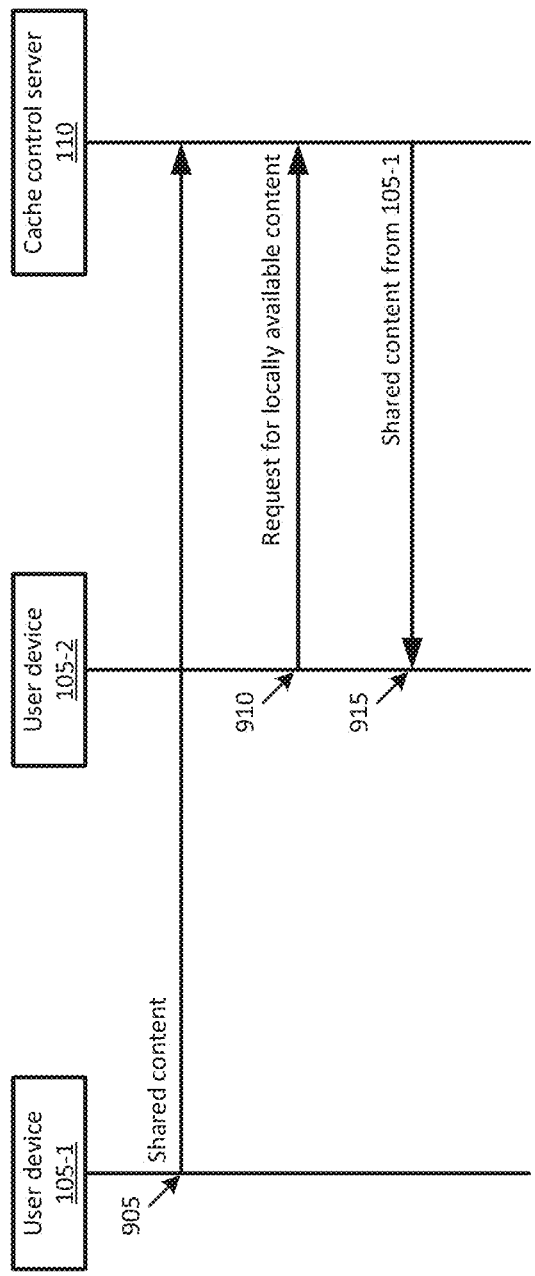
FIG. 9 illustrates an example signal flow, according to one or more implementations in which a cache control server may provide content, published by one user device, to another user device.

FIG. 9 illustrates an example signal flow, according to one or more implementations in which a cache control server may provide content, published by one user device, to another user device. As shown in FIG. 9, user device 105-1 may output (at 905) content to cache control server 110, which may store the content. User device 105-2 may output (at 910) a request for locally available content to cache control server 110. For example, user device 105-2 may present an interface, via which a user may select an option to browse locally available shared content and/or resources (e.g., content that has been shared by user devices 105 that are in the vicinity of user device 105-2).

Cache control server 110 may, in some implementations, determine that user device 105-1 is in the vicinity of user device 105-2. Based on the request, and based on determining that user device 105-1 and 105-2 are near each other, cache control server 110 may output (at 915) the shared content to user device 915. Alternatively, or additionally, cache control server 110 may output information regarding the shared content (e.g., a list of available content, from which one or more particular content items may be selected).

Figure 10:
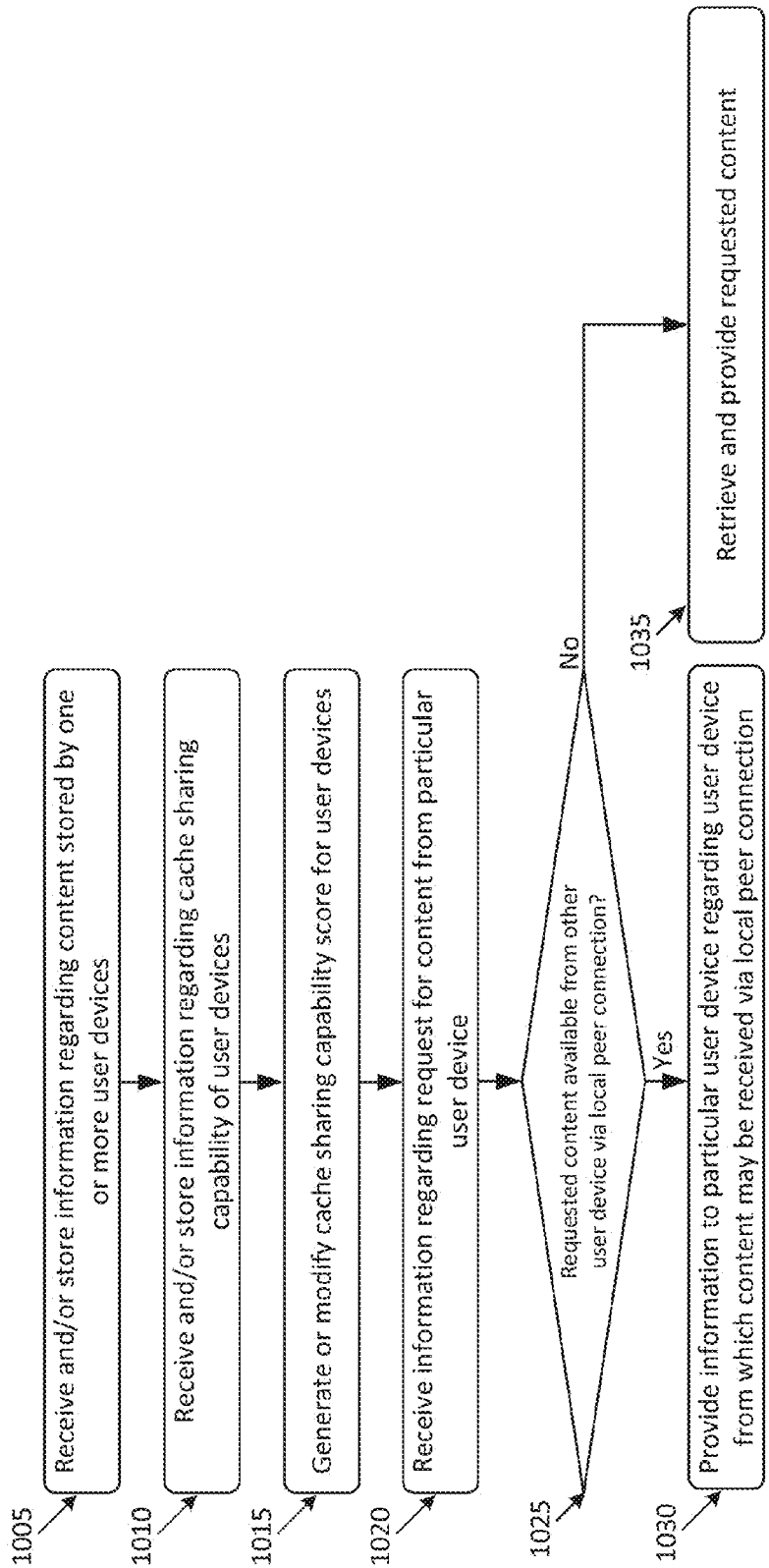
FIG. 10 illustrates a flowchart of an example process, in which a cache server may facilitate the providing of stored content to a user device.

FIG. 10 illustrates an example process 1000, in which a cache control server may facilitate the providing of stored content to a user device. In some implementations, process 1000 may be performed by cache control server 110.

Process 1000 may include receiving and/or storing information regarding content stored by one or more user devices (block 1005). For example, cache control server 110 may receive information from one or more user devices 105 regarding content stored by user devices 105. Additionally, or alternatively, cache control server 110 may receive information regarding content requested by, and/or provided to, user devices 105. For example, cache control server 110 may intercept requests for content, from user devices 105, that are directed to PDN 115 (e.g., requests for web pages).

Process 1000 may also include receiving and/or storing information regarding cache sharing capability of the user devices (block 1010). For example, cache control server 110 may receive information regarding wireless technologies used by user devices 105, battery level information associated with user devices 105, strength of wireless radios associated with user devices 105, information regarding user preferences associated with user devices 105, and/or other information regarding the capability of user devices 105 to provide content to other user devices 105 via a local peer connection. Cache control server 110 may receive this information from, for example user devices 105 and/or one or more other devices (e.g., a HSS server, a AAA server, and/or another device).

Process 1000 may additionally include generating or modifying a cache sharing capability score for the user devices (block 1015). For example, cache control server 110 may generate or modify a cache sharing capability score based on some or all of the information received at block 1010. As an example, a particular user device 105, which is associated with a relatively strong radio and a relatively high battery level may be associated with a relatively high cache sharing capability score, while another user device 105, which is associated with a relatively weak radio and/or a relatively lower battery level may be associated with a lower cache sharing capability score.

Process 1000 may further include receiving information regarding a request for content from a particular user device (block 1020). For example, cache control server 110 may intercept a request for content, from a particular user device 105, to PDN 115.

Process 1000 may also include determining whether the requested content is available from another user device via a local peer connection (block 1025). For example, as described above, cache control server 110 may determine whether the requested content corresponds to content (e.g., unexpired content) that is stored by a particular user device 105, with which a local peer connection may be made by user device 105 (from which the request for content is received at block 1025). In some situations, the requested content may be available from multiple user devices 105. In such situations, cache control server 110 may select one of the multiple user devices 105 based on, for example, the cache sharing capability score (e.g., the particular user device 105 with the higher cache sharing capability score).

If the requested content is available from the another user device via a local peer connection (block 1025—YES), then cache control server 110 may, in some implementations, provide information to user device 105 (from which the request for content was received at block 1025) regarding another user device 105, from which the requested content may be received via a local peer connection (block 1030). Additionally, or alternatively, as discussed above, cache control server 110 may provide an instruction to the particular user device 105 (that stores the content) to provide the stored content to user device 105 (from which the request for content was received).

If, on the other hand, the requested content is not available (block 1030—NO), then cache control server 110 may retrieve and provide the requested content to the user device (block 1035). For example, cache control server 110 may request the content from PDN 115, and may provide the content to user device 105.

Figure 11:
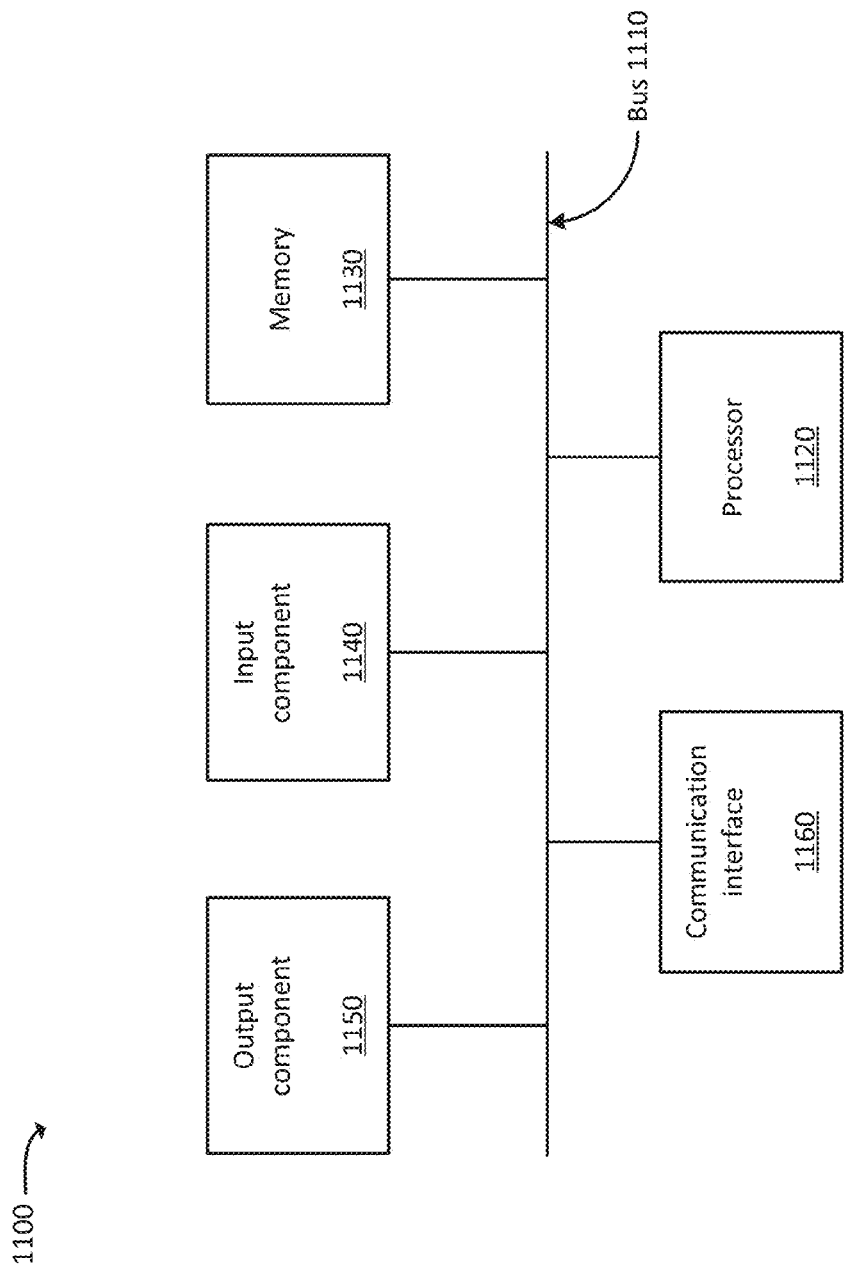
FIG. 11 illustrates example components of one or more devices shown in FIGS. 1 and 2.

FIG. 11 is a diagram of example components of device 1100. Each of the devices illustrated in FIGS. 1 and 2 may include one or more devices 1100. Device 1100 may include bus 1110, processor 1120, memory 1130, input component 1140, output component 1150, and communication interface 1160. In another implementation, device 1100 may include additional, fewer, different, or differently arranged components. Some non-limiting examples of device 1100, with additional and/or different components, are discussed below.

Bus 1110 may include one or more communication paths that permit communication among the components of device 1100. Processor 1120 may include a processor, microprocessor, or processing logic that may interpret and execute instructions. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100, such as a keyboard, a keypad, a button, a switch, etc. Output component 1150 may include a mechanism that outputs information to the operator, such as a display, a speaker, one or more light emitting diodes ("LEDs"), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared ("IR") receiver, a Bluetooth radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while a series of signals have been described with regard to FIGS. 4A, 4B, and 5-9, the order of the outputting of these signals may be modified in other implementations. Further, non-dependent signals may be outputted in parallel.

It will be apparent that embodiments, as described above, may be implemented in many different forms of software, firmware, and hardware in the implementations illustrated in the figures. The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items, and may be used interchangeably with the phrase "one or more." Where only one item is intended, the term "one" or similar language is used. Further, the phrase "based on" is intended to mean "based, at least in part, on" unless explicitly stated otherwise.

What is claimed is:

1. A method, comprising:
   receiving, by a server device, an indication that a first user device stores a particular content item;
   receiving, by the server device and from a second user device, a request for content;
   determining:
      an amount of power supplied to a radio transceiver associated with the first user device, and
      a remaining amount of battery power associated with the first user device;
   determining, by the server device, that the requested content is available from the first user device, the determining including:
      determining that a cache sharing capability score, associated with the first user device, exceeds a threshold value, the cache sharing capability score being based on:
         the amount of power supplied to the radio transceiver associated with the first user device, and
         the remaining amount of battery power associated with the first user device;
      determining that the particular content item stored by the first user device corresponds to the request for content;
   determining that a local peer connection is available between the first user device and the second user device, wherein the local peer connection is a direct wireless connection between the first user device and the second user device, without any other devices intervening in a signal path between the first user device and the second user device;
   comparing the cache sharing capability score, associated with the first user device, to a cache sharing capability score associated with a third user device that also stores the same particular content item;
   selecting, based on the comparing, the first user device, in lieu of the third user device, to provide the requested content to the second user device; and
   outputting, by the server device and to the second user device, information indicating that the requested content is available from the first user device, the information causing the second user device to receive the requested content from the first user device via the local peer connection,
   the outputting being performed based on the determination that the requested content is available from the first user device.

2. The method of claim 1, wherein determining that the requested content is available from the first user device further comprises:
   determining that the particular content item, stored by the first user device, is not expired.

3. The method of claim 1, wherein the cache sharing capability score is further based on:
   a set of user preferences, relating to sharing content, associated with the first user device.

4. The method of claim 1, wherein the particular content item corresponds to a particular web page that was previously cached by the first user device, wherein the request for content includes a request for the particular web page.

5. The method of claim 1, wherein determining that the local peer connection is available between the first user device and the second user device includes determining that the first user device is within a particular distance of the second user device.

6. A server device, comprising:
   one or more memory devices to store a set of instructions; and
   one or more processors to execute the instructions, to:
      receive an indication that a first user device stores a particular content item;
      receive information regarding a battery level associated with the first user device;
      receive, from a second user device, a request for content;
      determine a score for the first user device, the determining including:
         determining that the particular content item stored by the first user device corresponds to the request for content,
         determining that a local peer connection is available between the first user device and the second user device, wherein the local peer connection is a direct wireless connection between the first user device and the second user device, without any other devices intervening in a signal path between the first user device and the second user device, and
         determining that the battery level, associated with the first user device, exceeds a threshold battery level;
      compare the score, associated with the first user device, to a score associated with a third user device that also stores the same particular content item;
      select, based on the comparing, the first user device, in lieu of the third user device, to provide the requested content to the second user device; and
      output, to the selected first user device, an instruction to output the requested content to the second user device via the local peer connection.

7. The server device of claim 6, wherein when selecting the first user device, the one or more processors are to:
   determine that the score, associated with the first user device, exceeds a threshold value.

8. The server device of claim 7, wherein the score for the first user device is based on a set of user preferences, relating to sharing content, associated with the first user device.

9. The server device of claim 6, wherein the score for the first user device is further based on a strength of a radio transceiver associated with the first user device.

10. The server device of claim 6, wherein the particular content item corresponds to a particular web page that was previously cached by the first user device, wherein the request for content includes a request for the particular web page.

11. The server device of claim 6, wherein when determining that the local peer connection is available between the first user device and the second user device, the one or more processors are to determine that the first user device is within a particular distance of the second user device.

12. A non-transitory computer-readable medium, storing processor-executable instructions, which, when executed by a processor of a device, cause the device to:
receive an indication that a first user device stores a particular content item;
receive an indication that a second user device stores the same particular content item;
receive, from a third user device, a request for content;
determine that the particular content item stored by the first user and the second user device corresponds to the request for content;
determine a first score for the first user device, based on:
a strength of a radio transceiver associated with the first user device, and
a remaining amount of battery power associated with the first user device;
determine a second score for the second user device, based on:
a strength of a radio transceiver associated with the second user device, and
a remaining amount of battery power associated with the second user device;
compare the first score to the second score;
select, based on comparing the first and second scores, a particular one of the first user device or the second user device;
determine that a direct wireless connection is available between:
the particular selected one of the first user device and the second user device, and
the third user device; and
output, to the selected one of the first user device or the second user device, and based on determining that the requested content is available from the selected user device, an instruction to output the requested content to the third user device.

13. The non-transitory computer-readable medium of claim 12, wherein the strength of the radio transceiver, associated with the first user device, is determined based on an amount of power supplied to the radio transceiver associated with the first user device, and
wherein the strength of the radio transceiver, associated with the second user device, is determined based on an amount of power supplied to the radio transceiver associated with the second user device.

14. The non-transitory computer-readable medium of claim 12, wherein the processor-executable instructions further cause the device to:
determine whether the first score or the second score exceed a threshold score,
wherein the selection is further based on the determination of whether the first score or the second score exceed the threshold score.

15. The non-transitory computer-readable medium of claim 12, wherein the processor-executable instructions further cause the device to:
determine whether the particular content item, stored by the first user device or the second user device, is not expired,
wherein the selection is further based on the determination of whether the particular content item, stored by the first user device or the second user device, is not expired.

16. The non-transitory computer-readable medium of claim 12, wherein the first score or the second score are further based on a set of user preferences, relating to sharing content, associated with the third user device.

17. The non-transitory computer-readable medium of claim 12, wherein the particular content item corresponds to a particular web page that was previously cached by the first user device and the second user device, wherein the request for content includes a request for the particular web page.

18. The non-transitory computer-readable medium of claim 12, wherein processor-executable instructions, to determine that the wireless connection is available, further include processor-executable instructions to:
determine that the particular selected one of the first user device and the second user device is within a particular distance of the third user device.

* * * * *